(No Model.)
J. N. PEW.
EXPANSION JOINT.
No. 374,371. Patented Dec. 6, 1887.
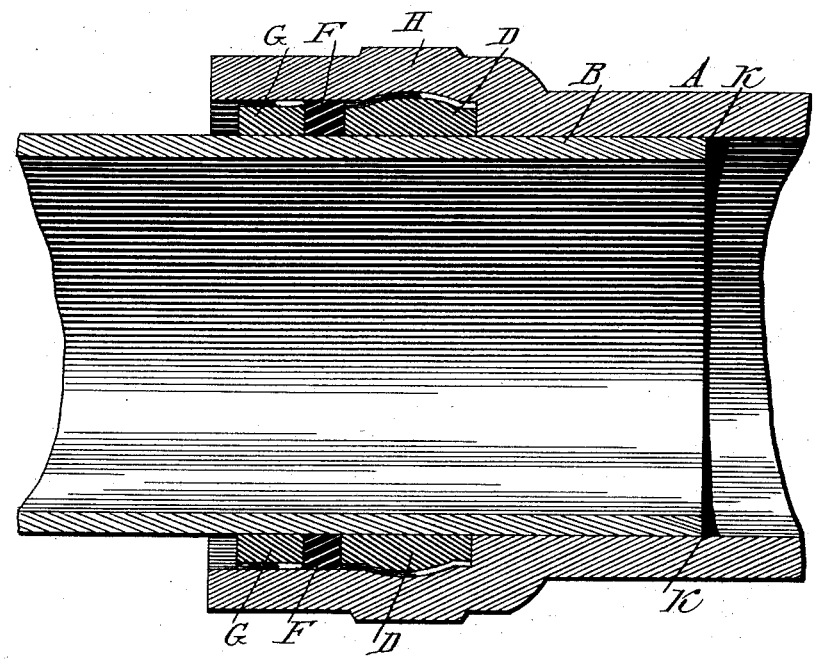
Witnesses.
Inventor:
Joseph N. Pew
by
William L. Pierce, Atty.

UNITED STATES PATENT OFFICE.

JOSEPH N. PEW, OF PITTSBURG, PENNSYLVANIA.

EXPANSION-JOINT.

SPECIFICATION forming part of Letters Patent No. 374,371, dated December 6, 1887.

Application filed April 7, 1886. Serial No. 198,060. (No model.)

*To all whom it may concern:*

Be it known that I, JOSEPH N. PEW, residing at Pittsburg, in the county of Allegheny and State of Pennsylvania, a citizen of the United States, have invented or discovered a certain new and useful Improvement in Expansion-Joints, of which improvement the following is a specification.

In devising systems for the conveyance and conduction of natural gas, inventors have hitherto commonly assumed that the joints of gas-mains must leak, and have chiefly directed their attention to constructions designed to catch and pipe away the leakage.

My invention, however, contemplates the use of a joint which will not permit this escape. The tendency to leakage in natural-gas mains is occasioned by the volatility of the gas, its high pressure, and the continued expansion and contraction of the mains as they are alternately heated and chilled. The result of this crawling of the main upon an unyielding joint is a severe strain, which may cause a fracture, and will almost certainly start leaks. It is desirable, therefore, in a gas-main, to provide a joint which will be perfectly tight, while at the same time permitting some play of the pipe-sections. These objects are accomplished by the use of my expansion-joint.

The accompanying drawing, which makes part of this specification, represents a cross-section of a gas-main, of either wrought or cast iron, equipped with my improvement. In the practice of my invention I prefer to pursue the following plan:

Over the pipe-length B, I slip in succession from the right-hand end, as shown in the drawing, a molded lead ring, G, a rubber ring, F, and a second molded lead ring, D. The length B is then slipped into the length A several inches to the point K, to allow an overlapping space for the play occasioned by the expansion and contraction of the main. The second lead ring, D, is then pushed into position, occupying a portion of the internal annular recess for packing, hollowed out in the length A. The lead ring D is then thoroughly calked and the rubber ring F put in position directly behind it. The lead ring G follows the rubber ring F, and is properly calked.

Although the use of a slip-joint greatly reduces the pull on the pipes, yet after some time the lead packing D will become somewhat loosened by the movement of the pipes; but the rubber ring F will intercept the slight escape so occasioned, while the lead ring G will prevent the rubber from being injuriously affected by water or other destructive agency.

If desired, instead of using molded lead rings, the lead packings may be made of molten lead, and the rubber ring F may be inserted at the same stage of the process, as indicated above, the lead for the inner packing being poured in through the aperture H. Both packings should be calked, as in the first method.

Under certain circumstances, when the pressure is very great, instead of alternating single lead and rubber rings, it will be advantageous to use groups of thin lead rings alternating with groups of thin rubber rings. The principle of my invention is entirely independent of the number of rings used; nor do I wish to confine myself to the particular packing materials mentioned, as spelter or like substances may be substituted for lead, and hemp, asbestus, or similar substances for rubber.

The purpose of my invention will be fulfilled by the employment of any heavy packing substance, preferably calked, to resist the first attack of escaping gas, supplemented by a packing adapted to fill any remaining points of leakage, but of less resistive strength, but still adequate to prevent the escape of the small quantity of gas which passes the first packing.

An important practical benefit derived from the character of this joint is the facility with which all the outer packings may be removed for renewal without cutting off the supply from the main, as the inner lead packing will be a sufficiently strong temporary barrier.

The same packing can be applied to a bowl-and-spigot joint, in which case the expansion would act in one direction only.

I am aware that devices have been employed to compress and retain the packing of joints by the use of a follower and clamping-bolts; but such devices I do not claim nor employ, as they are expensive in construction and require additional time and labor in their application, while experience has shown that the packing may be made tight enough by merely calking the lead packing.

It is apparent that the lead or rubber rings, or rings of whatever material used, are made of such a size that the internal circumference of each ring fits closely around the pipe-length B, while the exterior circumference fits closely around the interior of the pipe-length A.

I claim herein as my invention—

1. The combination of a pipe-length with annular recess at its end, a second pipe-length slipped within the first, a calked lead ring, a rubber ring, and second calked lead ring, substantially as and for the purposes described.

2. The combination of a pipe-length with annular recess at its end, a second pipe-length slipped within the first, a poured lead packing calked, a rubber ring, and second poured lead packing calked, substantially as and for the purposes described.

In testimony whereof I have hereunto set my hand.

JOSEPH N. PEW.

Attest:
WILLIAM L. PIERCE,
SAMUEL B. SCHOYER.